United States Patent [19]
Long et al.

[11] Patent Number: 5,611,246
[45] Date of Patent: Mar. 18, 1997

[54] VARIABLE ANGULAR VELOCITY COUPLING FOR RECIPROCATING DEVICES

[75] Inventors: Michael Long, Rochester; James A. White, Conesus, both of N.Y.

[73] Assignee: Eastman Kodak Company, Rochester, N.Y.

[21] Appl. No.: 415,867

[22] Filed: Apr. 3, 1995

Related U.S. Application Data

[63] Continuation-in-part of Ser. No. 107,749, Aug. 20, 1993, abandoned.

[51] Int. Cl.⁶ ........................................... F16H 35/02
[52] U.S. Cl. ............................. 74/393; 74/49; 83/327
[58] Field of Search ..................... 74/49, 393; 83/327, 83/628

[56] References Cited

U.S. PATENT DOCUMENTS

| | | | |
|---|---|---|---|
| 3,121,361 | 2/1964 | Krämer | 83/327 |
| 3,433,107 | 3/1969 | Horton et al. | 83/117 |
| 3,653,304 | 4/1972 | Lenoir | 93/58.3 |
| 3,747,452 | 7/1973 | Gilev et al. | 83/132 |
| 3,782,231 | 1/1974 | Jannetty | 83/143 |
| 3,785,194 | 1/1974 | Bradlee | 72/405 |
| 3,886,830 | 6/1975 | Holthoff et al. | 83/285 |
| 4,244,250 | 1/1981 | Rudszinat | 83/310 |
| 5,182,935 | 2/1993 | Schockman | 72/417 |

FOREIGN PATENT DOCUMENTS

| | | | |
|---|---|---|---|
| 1502740 | 12/1970 | Germany | 83/327 |
| 3504297 | 8/1986 | Germany | B23D 25/06 |
| 6502999 | 9/1965 | Netherlands . | |

OTHER PUBLICATIONS

*Ingenious Mechanisms for Designers and Inventors*, vol. 1, 1930, "Cams and Their Applications", pp. 11–12.

Primary Examiner—Charles A. Marmor
Assistant Examiner—David M. Fenstermacher
Attorney, Agent, or Firm—Clyde E. Bailey, Sr.; Charles E. Snee, III

[57] ABSTRACT

Apparatus for providing a variable angular velocity coupling between an input shaft (52, 78) and an output shaft (71, 138) includes a fixed frame (72, 74, 76); a first bearing (80) for mounting the input shaft for rotation relative to the fixed frame; a second bearing (140) for mounting the output shaft for rotation relative to the fixed frame; a pair of conjugate cams (48, 50; 82, 84) mounted to the fixed frame, concentric with the input shaft: a first cam follower (54, 60; 114, 118) pivotably supported (64, 66; 90, 92, 98, 100, 102, 104) by the input shaft for engaging a first of the cams; a second cam follower (56, 58; 116, 120) pivotably supported by the input shaft for engaging a second of the cams; a first link (68, 122) extended between the first and second cam followers to cause the followers to move in tandem in response to rotation of the input shaft relative to the cams: an radially extended output arm (70, 136) supported by the output shaft; and a second link (72, 74; 132, 134) extended between at least one of the cam followers and the output arm to rotate the output shaft in response to rotation of the input shaft, the cams having profiles (50; 148, 150, 152) to cause a relative angular displacement between the input and output shafts, thereby creating a sinusoidally varying angular velocity of the output shaft over a portion of each revolution in response to a constant angular velocity of the input shaft.

4 Claims, 12 Drawing Sheets

VARIABLE ANGULAR VELOCITY COUPLING FOR RECIPROCATING DEVICES

Cross Reference to Related Application

This application is a continuation-in-part of Ser. No. 08/107,749 filed 20 Aug. 1993, which is to be abandoned as of the filing date of this application.

DESCRIPTION

1. Field of the Invention

The invention concerns couplings for transmitting rotary input power to an associated apparatus. More particularly, the apparatus of the invention provides a variable angular velocity coupling for reciprocating devices and other devices exhibiting harmonic motion.

2. Background of the Invention

Sheet materials such as X-ray films or credit cards rather commonly exhibit rounded corners. According to a first known technique, such corners have been rounded first by making notches exhibiting the rounded shape common to two adjacent sheets on the edges of a moving web; and then by cutting the moving web in the middle of the notches. A problem with such a technique has concerned the difficulty of properly positioning the cutter or chopper with respect to the notch center. In fact, the smallest positioning defect of the chopper has caused an incomplete rounding of one of the sheets and a residual strip at the end of the other sheet.

Another known technique has required that the process be stopped after a sheet has been cut, while the sheet is positioned and the corners are rounded. Of course, this technique has suffered from rather low productivity. According to still another technique, during a first operation, the web has been cut into sheets; and then a given number of sheets has been stacked. Then the stack of sheets has been moved to an apparatus designed to round the corners. In addition to cost and complexity problems, such a technique has exhibited problems due to improper stacking of the sheets. There have also been other systems, such as on-line rotary systems, which have exhibited significant problems due to the complexity of the operations required for changing from one sheet format to another.

In most of these known techniques, various reciprocating punching and chopping devices have been used where the cutting or perforating tooling has been oscillated to match the velocity of a constantly moving web over a short period of the cycle during which an operation is performed on the web. These devices have used various eccentrics, crank arms with connecting rods, or four bar linkages, to impart essentially simple harmonic motion to the tooling. These arrangements have been advantageous in that they have allowed for a very simple drive system and have provided smooth, shock-free motion. However, since there is no region of constant velocity in simple harmonic motion, the cutting or perforating tooling has had to engage and disengage itself from the moving web as quickly as possible in order to minimize the displacement error between the tooling and the web.

The synchronization of the web and the tooling movements has been optimized such that a small negative displacement error of the tooling upon first contact with the web has been compensated for during the cutting process when the tooling has a positive displacement error relative to the web. This approach has yielded a net zero displacement error for the cycle. However, the effects of the negative and positive displacement errors often have been measured in the finished web, particularly in the case of a sheet chopper where a non-square sheet edge results. In punching operations where pilot pins precede the entry of punches to precisely position the web just prior to punching, the restricted engagement time has required the piloting to be accomplished in a minimum amount of time and with higher, undesirable pilot-to-web forces.

Patent DE 3,504,297 describes a device arranged for cutting the leading and trailing edges of a material of large width in a hot strip mill. This device comprises two pairs of two groups of blades, longitudinally spaced, continuously coupled with respective driving devices, through pairs of corresponding rods. Such a device has, due to its arrangement, timing problems of blade movement, which would make it inappropriate for solving the problems previously described.

Using a servo-feedback system to alter the input angular velocity to the eccentric and thereby to alter the simple harmonic motion profile of the tooling to include a constant velocity region, would add to the cost of the system and would be capable of modifying the velocity profile as required only at relatively low speeds. At only 500 cycles per minute, for example, the velocity correction would need to closely follow a particular sinusoidal profile for a period of about 17 milliseconds every 120 milliseconds. This may exceed the capabilities of currently available feedback systems where there is any appreciable load inertia.

SUMMARY OF THE INVENTION

An object of the invention is to provide a variable angular velocity coupling for use in reciprocating apparatus.

A further objective of the invention is to provide such a coupling which will accept a constant input angular velocity and produce a sinusoidally varying output angular velocity over a portion of each revolution.

A still further objective of the invention is to provide such a coupling which can modify the simple harmonic motion of eccentrically driven reciprocating and orbiting tooling to include a plateau of constant velocity motion.

Other objects of the present invention will appear in more detail in the following description. However, the invention is defined by the claims.

The double eccentrics may be driven by a variable angular velocity coupling having an input shaft and an output shaft. The coupling may include a fixed frame rotatably supporting the input and output shafts. A pair of conjugate cams is fixedly mounted to the fixed frame, concentric with the input shaft. A first cam follower is pivotably supported by the input shaft for engaging a first of the cams; and a second cam follower is pivotably supported by the input shaft for engaging a second of the cams. A first flexure link is extended between the first and second cam followers to cause the followers to move in tandem in response to rotation of the input shaft relative to the cams. A radially extended output arm is supported by the output shaft; and a second flexure link is extended between at least one of the cam followers and the output arm to rotate the output shaft in response to rotation of the input shaft. The cams have profiles to cause a periodic relative angular displacement between the input and output shafts, thereby creating a sinusoidally varying angular velocity of the output shaft over a portion of each revolution in response to a constant angular velocity of the input shaft. The velocity profile of the output shaft is inverse to the sinusoidal motion profile imparted by the double eccentric of the tooling. Thus, the two profiles cancel each other to yield a constant velocity region of about 50° of rotation of the double eccentric.

The invention provides various advantages. Use of the variable angular velocity coupling makes it possible and practical for double eccentric presses, reciprocating choppers and other reciprocating apparatus to essentially perfectly match the linear velocity of a continuously moving web over at least 50° of rotation. The result is greatly reduced web deformation, straighter chopped edges on sheets, the ability to use chopping knives with increased shear angles, and the ability to perform multiple sequential operations on a moving web with a single eccentric driven press. The punch or chopper also can be synchronized with other devices such as stripper plates which are driven independently but at constant velocity.

BRIEF DESCRIPTION OF THE DRAWINGS

The following detailed description will be made with reference to the drawings wherein.

DETAILED DESCRIPTION OF THE INVENTION

Figure 1:
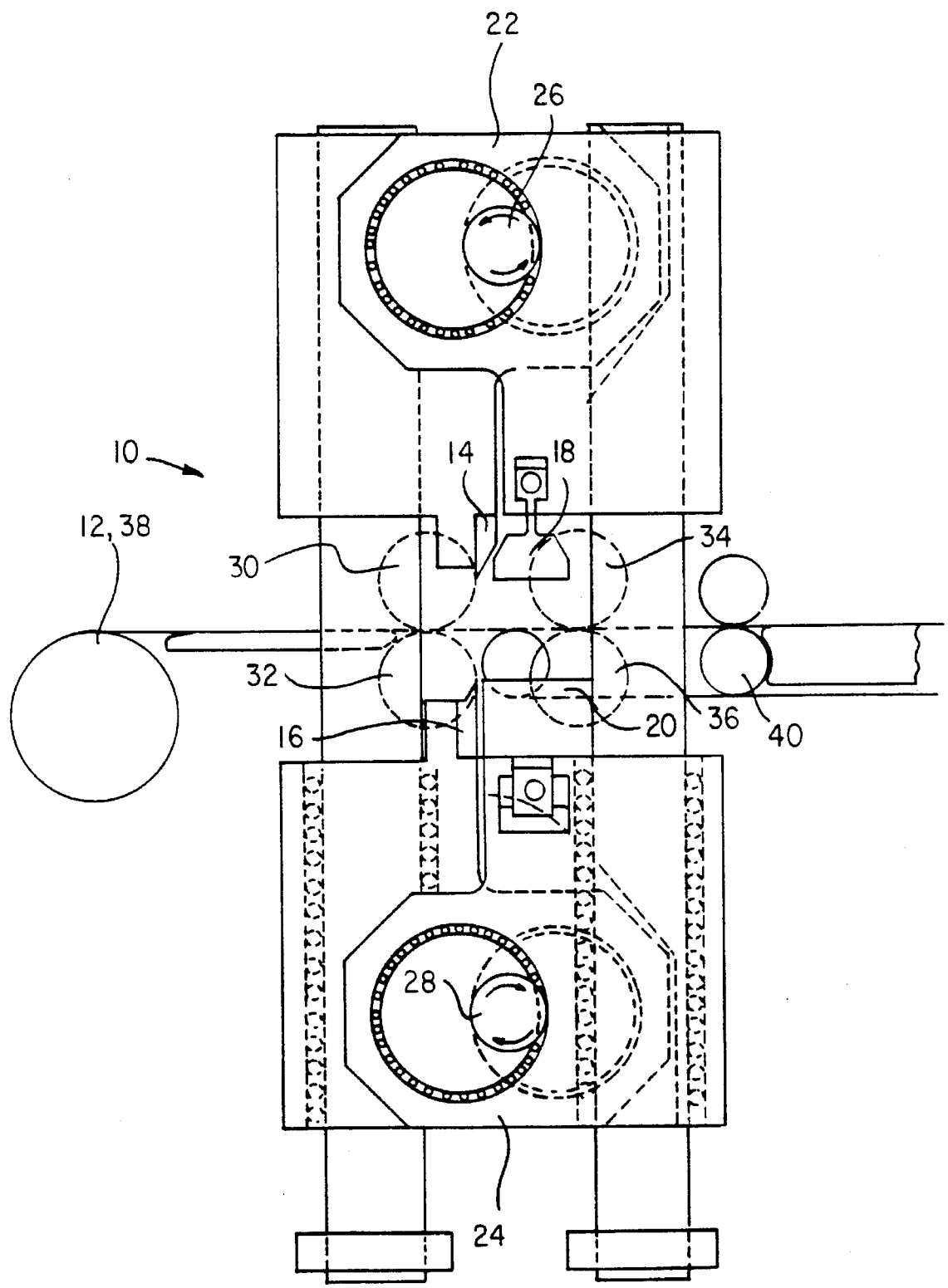
FIG. 1 schematically illustrates an embodiment of the chopper and corner rounder according to the invention.

FIG. 1 illustrates one embodiment of a chopping and corner rounding apparatus 10 according to the invention. A stock roll 12 provides the web material to be cut into sheets exhibiting rounded corners such as sheets of an X-ray film material. The web is fed by conventional drive means and guide means, not illustrated. The apparatus includes a chopper comprising an upper knife 14, a lower knife 16 and a device for rounding the corners comprising two punch and die modules 18, 20 facing each other with one on each side of the web. These elements are driven by means of two double eccentrics 22, 24, each eccentric being driven by a single, respective motor shaft 26, 28. Motor shaft 26 of the first double eccentric is driven in a first rotation direction and motor shaft 28 is driven at the same speed and in a direction opposite to the first rotation direction. As a result, the phases of the two motor shafts are of opposite signs. Double eccentric 22 drives the upper knife module 14 and, as a unit, the two punch modules 18 (or the two die modules 20), the first and second eccentrics being, as shown on FIG. 1, in opposition of phase. Double eccentric 24 drives the lower knife module 16, and as a unit, the two die modules 20 (or the two punch modules 18), the third and fourth eccentrics being also, as shown on FIG. 1, in opposition of phase. Double eccentrics 22, 24 are arranged so that the upper knife as well as the punches cooperate respectively with the lower knife and the dies, such as known in the art. Each motor shaft is driven at a constant velocity (for example, 300 rpm) or, according to a preferred embodiment, by means of a variable angular velocity coupling to be described subsequently. This coupling imparts to the cutting and corner rounding tools a velocity equal to the web velocity during the whole engagement period of the tools with the web. According to a preferred embodiment, the two motor shafts 26, 28 are, by appropriate gear devices, driven by the same motor. Such an arrangement permits synchronization of the motion of the two double eccentrics. The different tools thus mounted each describe, according to a well defined timing, a circular path in a plane perpendicular to the unwinding axis of the web. The circular paths 30, 32, 34, 36 of the different tools are shown in dotted lines in FIG. 1.

Figure 2A:
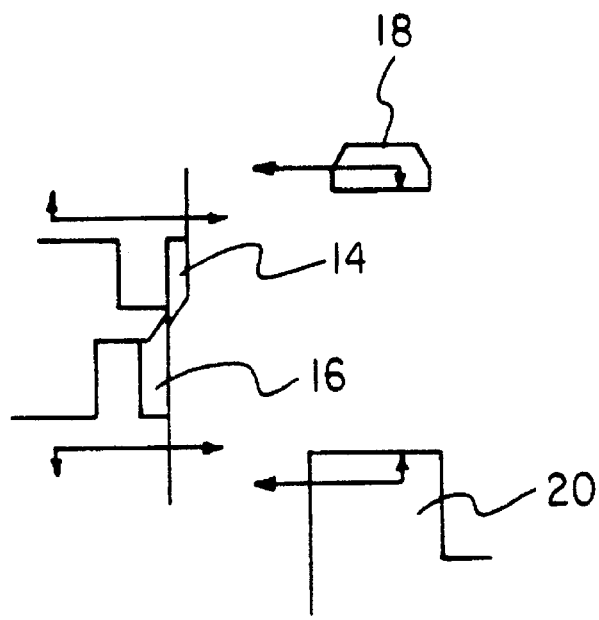
FIGS. 2A and 2D schematically illustrate the different operative steps of the apparatus of FIG. 1.
Figure 2B:
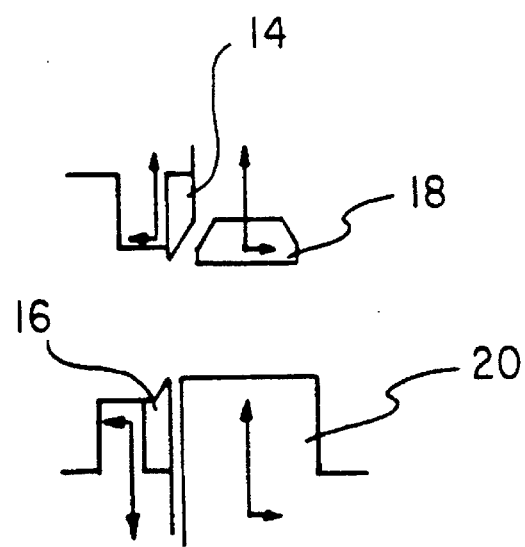
Figure 2C:
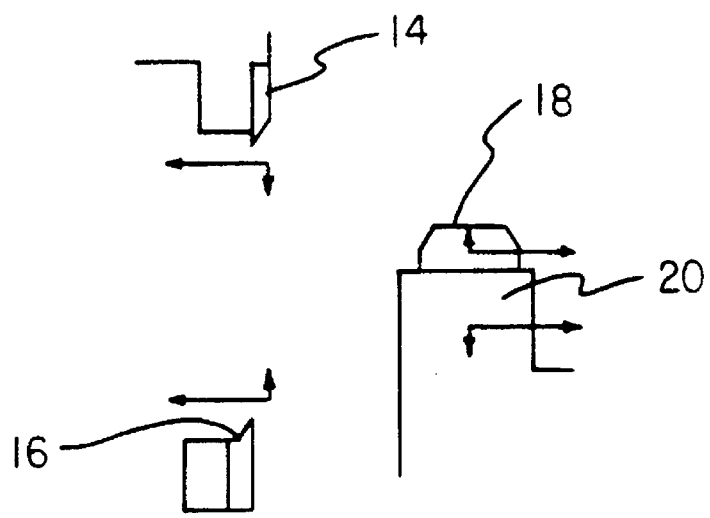
Figure 2D:
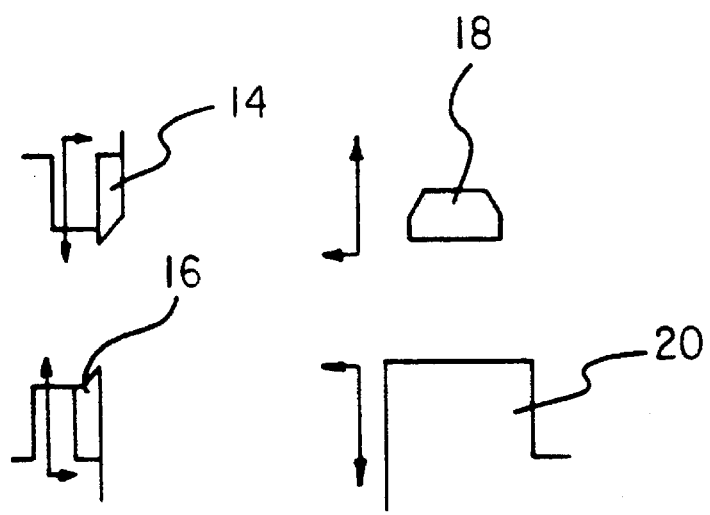

The timing of the respective motion of each tool will now be described in more detail with reference to FIGS. 2A to 2D. Upper knife 14 and lower knife 16 are shown in FIG. 2A in the cutting position, facing each other on their respective circular paths. Punch modules 18 and die modules 20 are respectively opposite to each other on their respective circular paths. In FIG. 2B, after a 90° rotation of each double eccentric, the apparatus passes through a first intermediate position wherein upper knife 14 and punch modules 18 are facing each other on their respective circular paths. Lower knife 16 and the die modules 20 are similarly positioned. In FIG. 2C, after a further 90° rotation of each double eccentric, the situation is reversed with respect to FIG. 2A. Punches 18 and dies 20 are engaged with the web and are respectively facing each other on their respective circular paths. Upper knife 14 and lower knife 16 are opposite to each other on their respective paths. In FIG. 2D, after a still another 90° rotation of each double eccentric, the apparatus passes through a second intermediate position wherein upper knife 14 and punch module 18 are opposite to each other on their respective circular paths. Lower knife 16 and die module 20 are similarly positioned.

Thus, when the apparatus is in the position shown on FIG. 2A, the upper knife and the lower knife are engaged with the web material thus separating the sheet $F_{n+1}$ from the "sheet" $F_n$, the trailing edge of which is still attached to the web material roll. See also FIG. 3. After a 180° rotation of each double eccentric to the position of FIG. 2C, the punch modules and the die modules are engaged with the web, thus rounding the corners of both the trailing edge of the sheet $F_{n+1}$ and the leading edge of the "sheet" $F_n$. A differential motion device, to be described subsequently, is provided in the sheet transporting apparatus in order to move sheet $F_{n+1}$, during the time interval corresponding to the 180° rotation of the double eccentrics, a distance slightly larger than the distance traveled by "sheet" $F_n$ which is still attached to the web material roll. According to one embodiment, this distance variation is in the order of 2 mm. After a further 180° rotation of each double eccentric, sheet $F_n$ is separated from sheet $F_{n-1}$ and so on. Removing, guiding and receiving means, not illustrated, may be provided for the individual sheets at the output of the apparatus according to the invention.

The presence of the corner rounder immediately adjacent to the chopper permits rounding the corners of the leading edge of "sheet" $F_n$ while the sheet is still attached at its trailing edge to the web material roll, thus avoiding the punch positioning problems with respect to this sheet. The corners of the other edge of the sheet are rounded immediately after the sheet was cut from the web material stock roll, thus minimizing the risk of mispositioning the sheet with respect to said punches. Such a system can be perfectly varied both in length and in width, length changes being performed by appropriately delaying or accelerating the double eccentric motion, width changes being performed by laterally displacing one of the punch and die modules.

Figure 3:
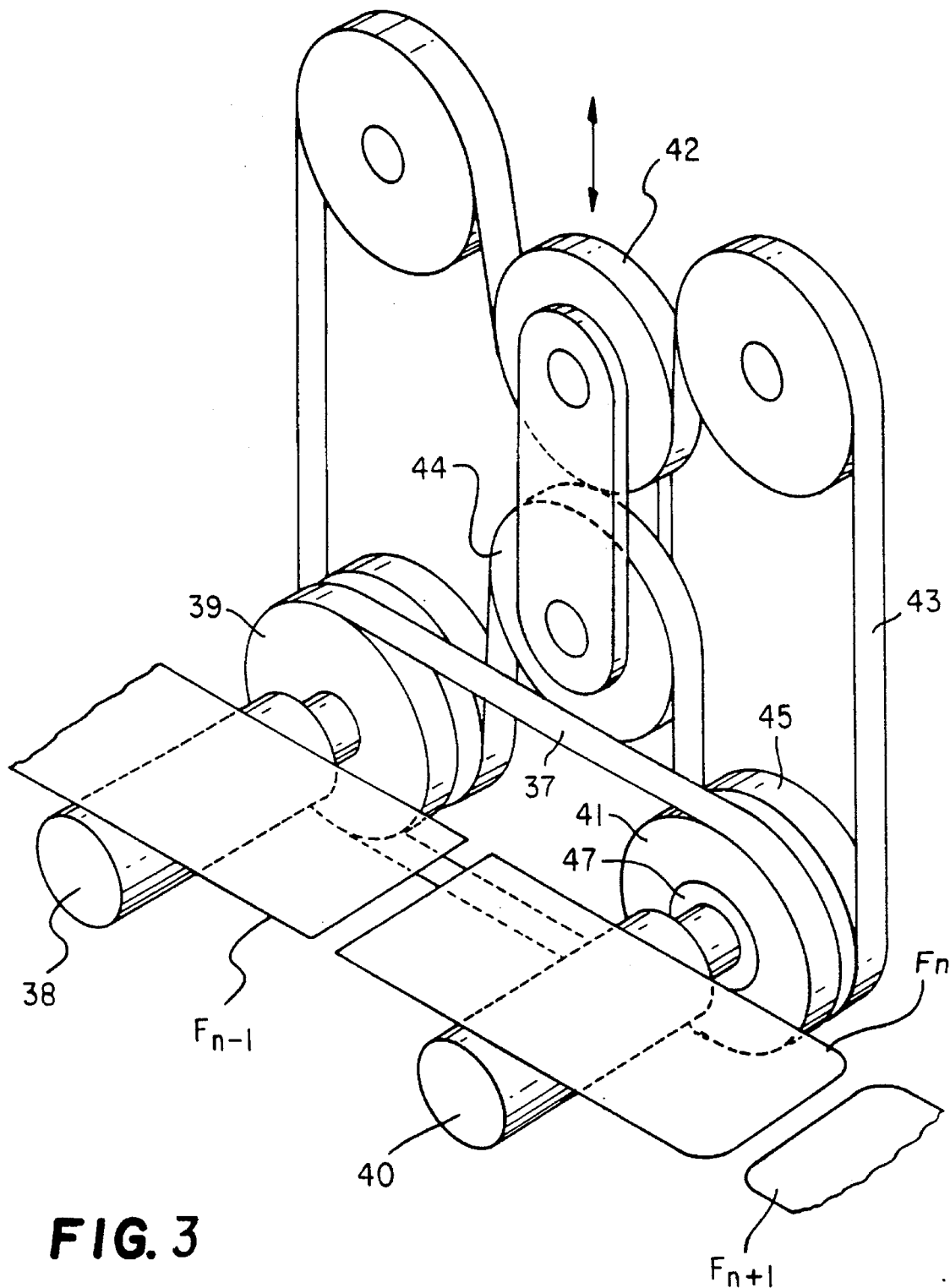
FIG. 3 illustrates an example of a differential motion device such as used in a preferred embodiment of the chopper and corner rounder according to the invention.

FIG. 3 illustrates a differential motion device which can be used, according to a preferred embodiment, to separate a sheet which has just been cut from the stock roll. The device mainly includes a motor shaft 38 rotating at a constant rate V. This motor shaft is coupled by means of a belt 37 and a set of pulleys 39, 41 to a second appropriate shaft 40, appropriate to drive sheet $F_n$ which was just cut from the stock roll, the two coupled central pulleys 42, 44 being controlled, for example, by the upper knife motion. As a result, the central pulleys exhibit a reciprocating motion, shown by an arrow. A belt 43 driven by pulleys 42, 44 drives a pulley 45 coupled to shaft 40 by an overrunning clutch, not illustrated. Pulley 41 is coupled to shaft 40 by a further overrunning clutch 47. Thus motion of pulleys 42, 44 allows, during the time interval where the upper knife goes to the top of its circular path, an increase in the velocity of shaft 40 and therefore, an acceleration of sheet $F_n$ which was just cut from the stock roll. Thus, sheet $F_n$ is separated of the stock roll by a distance which, in one embodiment, is in the order of 2 mm.

Figure 4A:
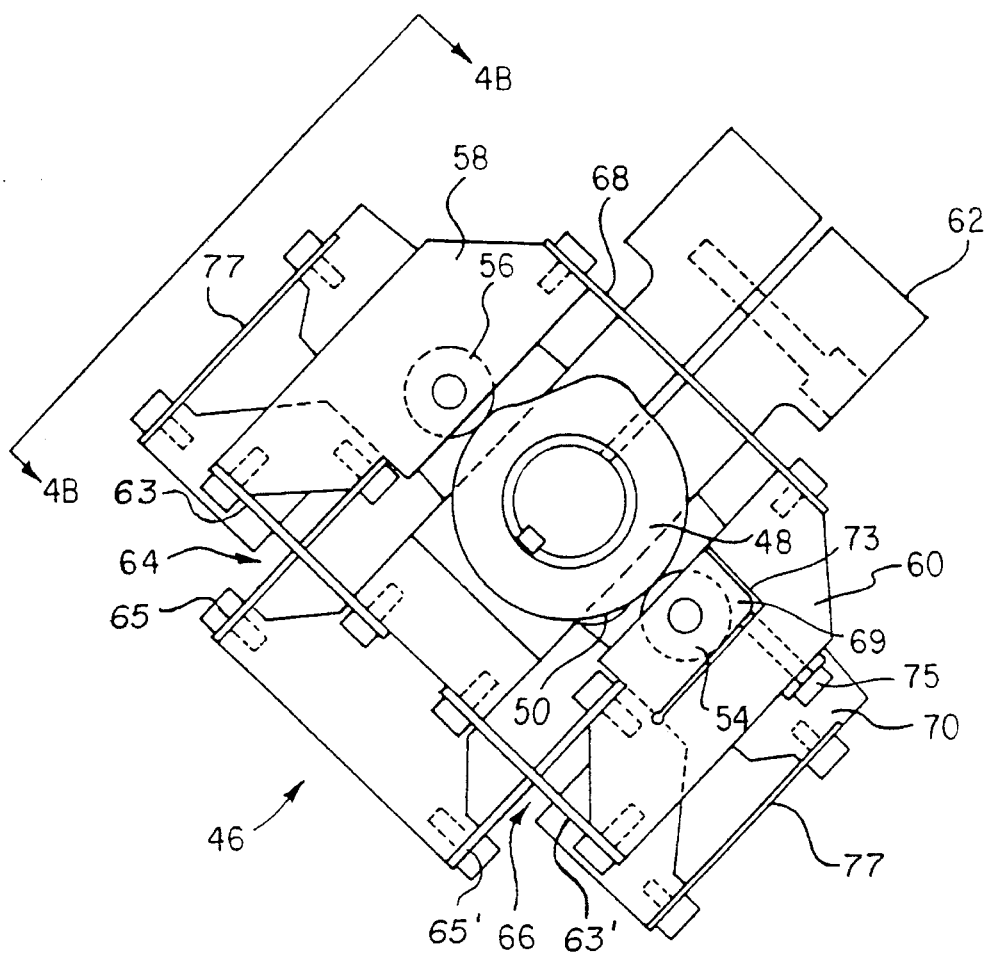
FIG. 4A and 4B illustrate a first embodiment of a variable angular velocity coupling according to the invention, such as used in a particular embodiment of the apparatus according to the invention.
Figure 4B:
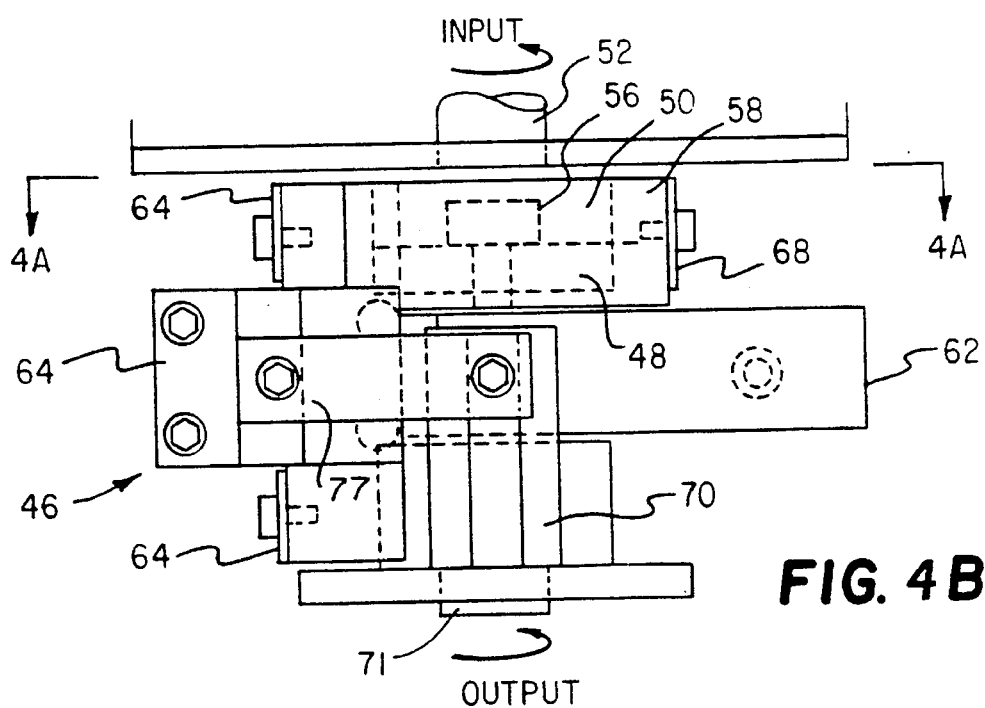
Figure 5A:
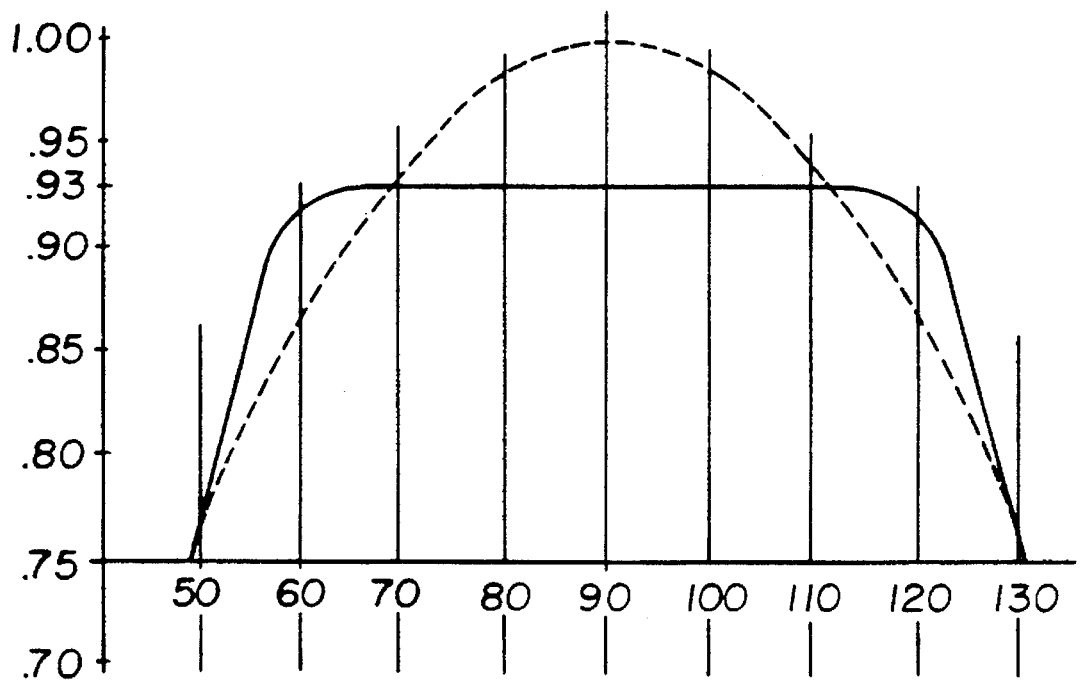
FIG. 5A and 5B show curves illustrating the operation of the variable angular velocity coupling device shown in FIGS. 4A and 4B.
Figure 5B:
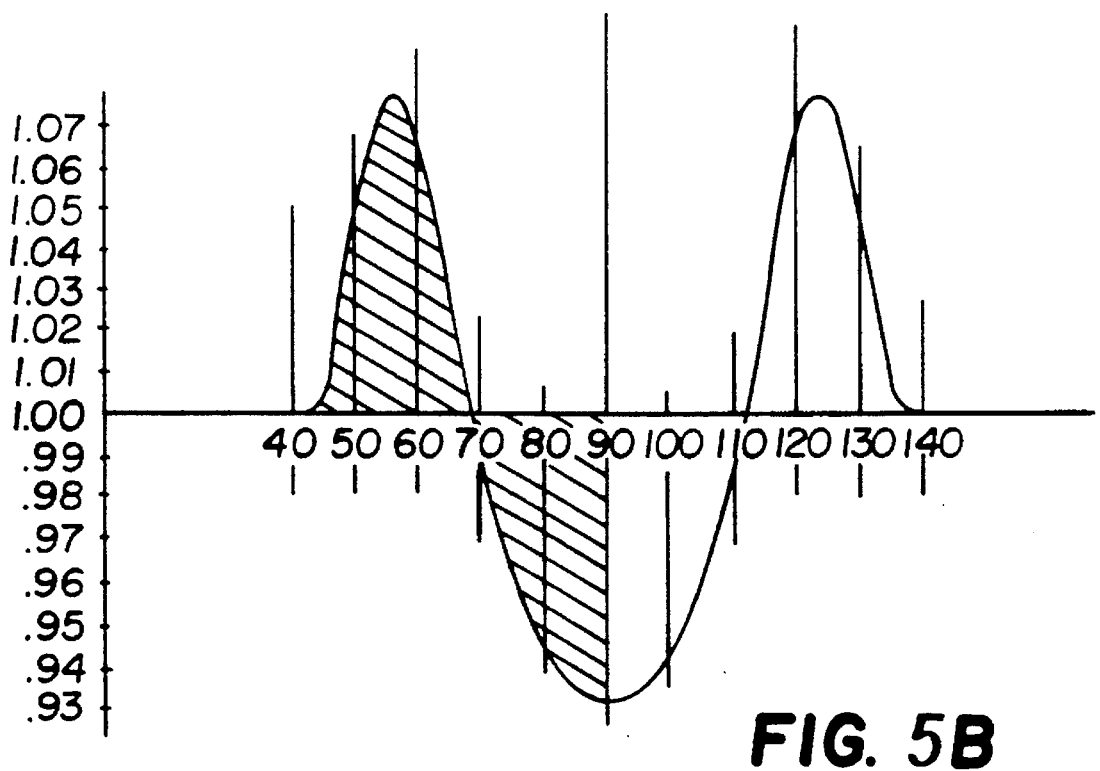
Figure 6:
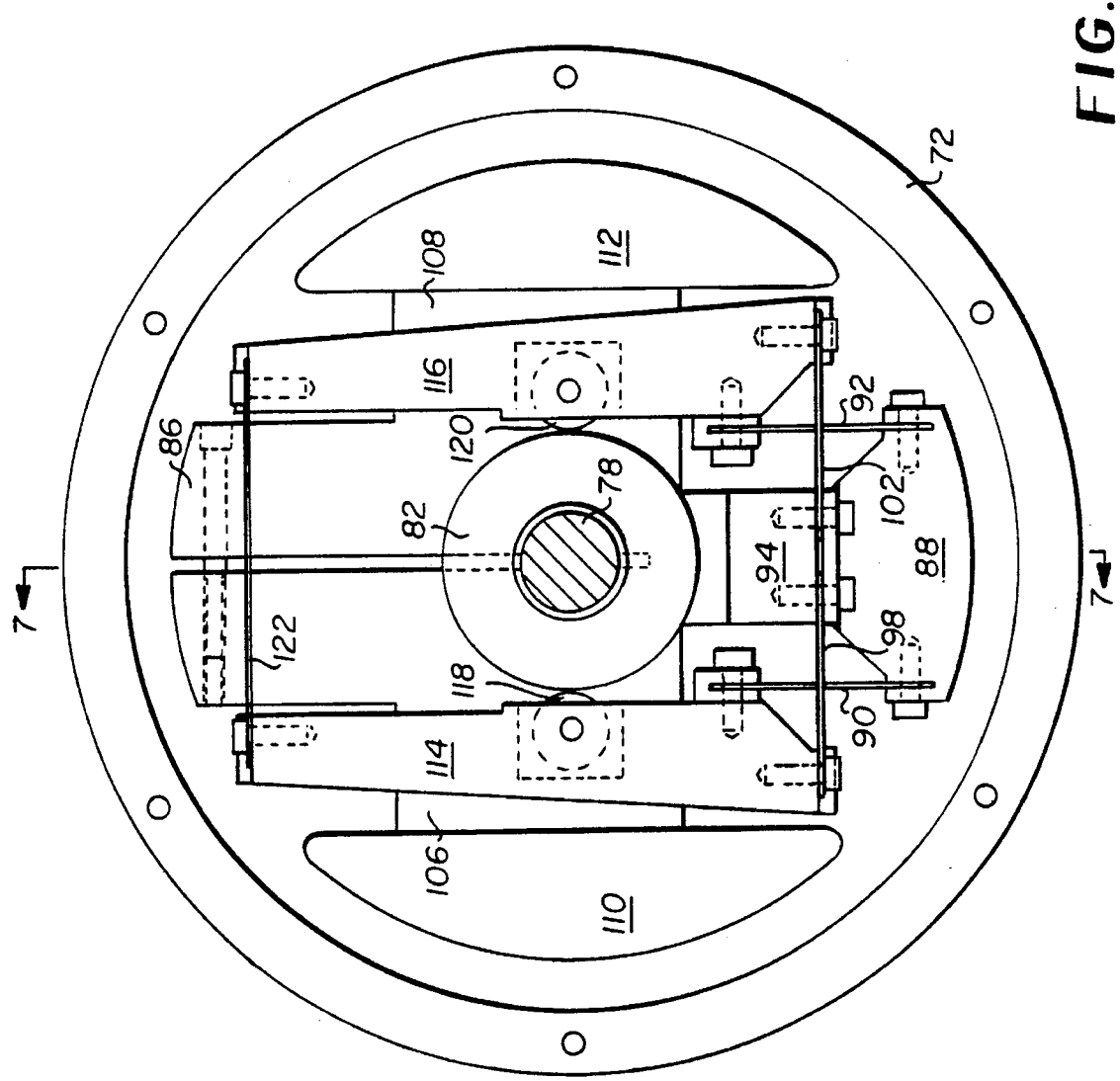
FIG. 6 illustrates a front view of a second embodiment of a variable angular velocity coupling according to the invention, taken along line 6—6 of FIG. 7.
Figure 7:
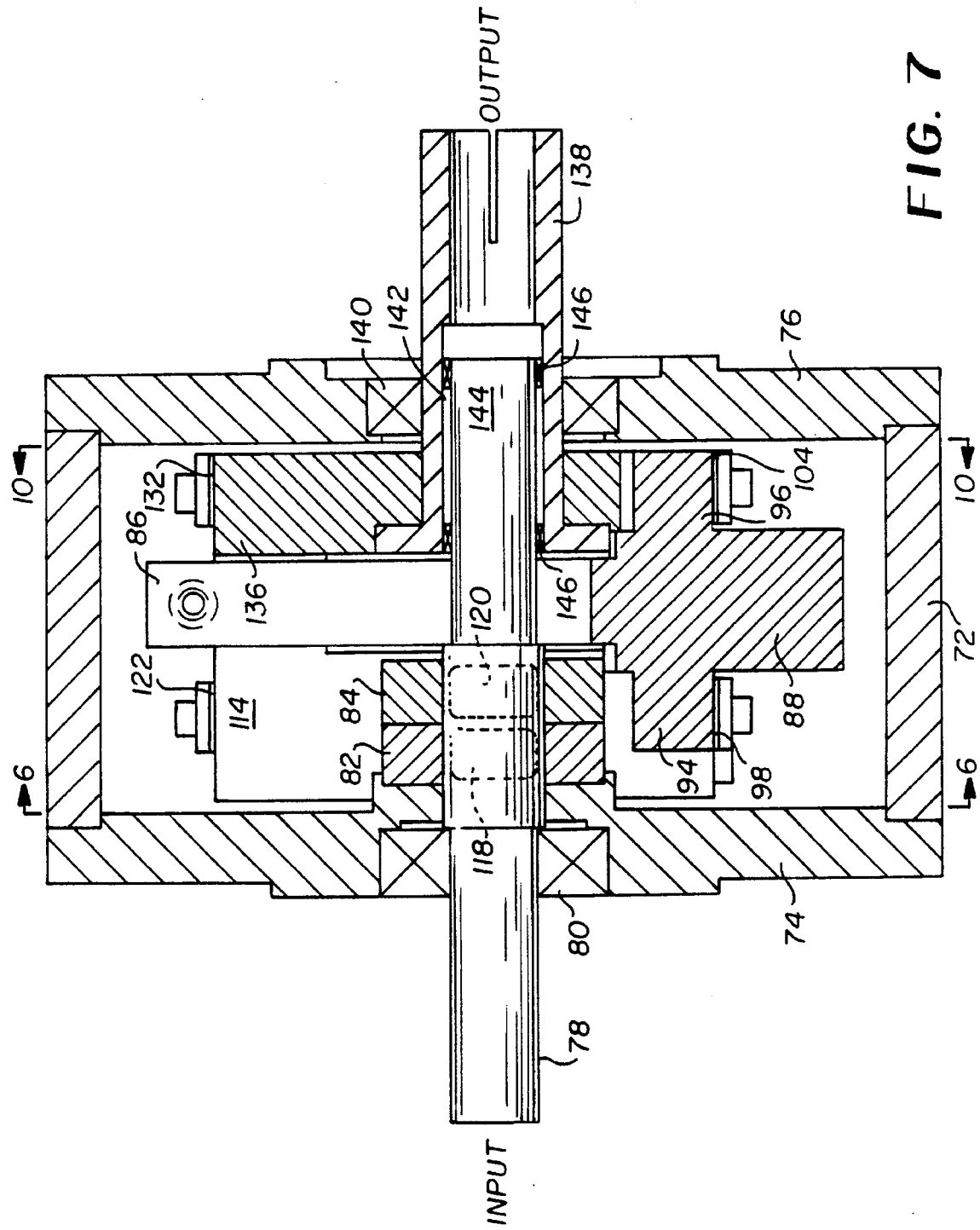
FIG. 7 illustrates a sectional view taken along line 7—7 of FIG. 6.

FIGS. 4A–4B illustrate a variable angular velocity coupling 46 such as used in a preferred embodiment of the chopper and corner rounder according to the invention. Coupling 46 includes a pair conjugate, stationary cams 48, 50, concentric with a motor shaft 52. As shown in FIGS. 4A and 11, the profiles of the cams are similar but complementarily arranged, the convex portion of one being placed at 180° from the concave portion of the other one, and vice-versa. In one embodiment, cams 48, 50 were fixed on the motor frame, not illustrated. A pair of cam followers 54, 56 are arranged at 180° around the two stationary cams and are respectively mounted on two cam follower carriers 58, 60. An input arm 62 is mounted for rotation with motor shaft 52 and is driven at a constant rate. Arm 62 is coupled by two sets of crossed flexures 64, 66 to one of the ends of each of cam follower carriers 58, 60, the other end of the first cam follower carrier being coupled to the other end of the second cam follower carrier by means of another flexure 68. These crossed flexures 64, 66 (comprising flexures 65, 53 and 65', 63', respectively, shown clearly in FIG. 4A) allow for a pivoting motion of the cam followers, without the wear and tear of conventional pivots, which can cause unwanted backlash. In order to compensate the distance variations which may exist between the two cam followers 54, 56 (unless perfectly machining the two cams, which would be very expensive), the flexure 68 may exhibit a slightly convex shape, not illustrated in FIGS. 4A and 4B. As an alternative, or in addition, to curved flexure 68, the cam followers can be engaged with the cams by providing a deformable portion 69 in carrier 60. A wire-cut slot 73 is provided through the carrier to define portion 69. Engagement of follower 54 with cam 48, 50 may be adjusted by means of a screw 75. A similar arrangement may be used in the embodiment of FIGS. 6 to 11. Use of flexure 68 allows the cam followers to perfectly follow the stationary cams and thus allows a better precision for the variable angular velocity motion. An output arm 70 is coupled to this cam and cam follower mechanism. Each end of output arm 70 is connected by a flexure 77, respectively to one of the two cam follower carriers 58, 60. As a result, the cam-induced rotation motion of each cam follower carrier about the hinge axis of each pair of crossed flexures o involves a proportional rotation of the output arm 70 relative to the input arm 62. The output arm 70 has a velocity which, such as represented in FIG. 5B, oscillates around the velocity value of the input arm 62. The output arm is, according to a particular embodiment, connected to an output shaft 71, typically the motor shaft of the chopper and corner rounder, by means of a torsionally rigid flexible coupling which essentially solves any problems due to a misalignment between the axis of the output arm and the control axis of the chopper and corner rounder. The use of these various flexures, instead of conventional hinges, eliminates the wear and looseness problems which would be due to such hinges and preserves the precise motion characteristics of the device.

As shown in FIG. 5B, the maximal velocity variations between the output arm (curve in dashed lines) and the nominal velocity of the input arm (abscissa axis) are, in the illustrated embodiment, on the order of ±7%. As represented in FIG. 5A, this velocity difference modifies the linear velocity of the chopper and corner rounder tools so that it perfectly matches, over an engagement angle of about 50° of the tool, the velocity of a web moving at a constant velocity. The curve in dotted lines illustrates the velocity of the input arm. The curve in continuous line illustrates the velocity of the output arm, substantially constant over about 50°. The use of such a device permits an increase in the engagement time of the chopper and corner rounder tools.

FIGS. 6 to 11 illustrate another embodiment of the variable angular velocity coupling according to the invention. A stationary cylindrical housing shell 72 is closed by a circular front cover plate 74 and a circular back cover plate 76. Cover plate 74, for example, may be mounted to the shaft of a drive motor in place of a conventional torsionally rigid but otherwise flexible coupling. Thus, shell 72 and cover plates 74, 76 o constitute a fixed frame for the coupling. An input shaft 78, which may be an extension of the drive motor shaft, is mounted for rotation relative to front cover plate 74 by a bearing 80 mounted in a bore in the cover plate. A pair of conjugate, stationary cams 82, 84 are fixedly mounted to an inside surface of the front cover plate, with shaft 78 extending freely through a central bore in each cam. A support or rotational input member 86 is fixedly mounted on shaft 78 inboard of the cams.

As seen in FIGS. 6, 7, 9 and 10, member 86 includes a radially extended boss 88 to which are attached a pair of spaced, parallel, generally radially extended pivot flexures 90, 92. Member 86 further includes, just radially inboard of and essentially orthogonal to boss 88, a pair of axially extended bosses 94, 96. Attached to boss 94 are a pair of coplanar, generally tangentially extended pivot flexures 98, 102; and to boss 96, a similar pair of pivot flexures 100, 104. Thus, pivot flexure pairs 90, 98; 92, 102; 90, 104; and 92, 100 are orthogonally arranged to act as pivots for cam follower carriers to be described subsequently. A pair of radial arms 106, 108 extend from member 86 and support respective counterweights 110, 112. A pair of cam follower carriers 114, 116 are supported, respectively, on flexure pairs 90, 98; 90, 104; and 92, 102; 92, 100. A pair of cam follower rollers 118, 120 are supported, respectively, by carriers 114, 116 in position to bear, respectively, on cams 82, 84. A tangential flexure 122 extends between and joins the carriers on an opposite side of the cams from flexure pairs 90, 98 and 92, 102, to ensure contact of the followers with the cams when shaft 78 rotates.

Figure 8:
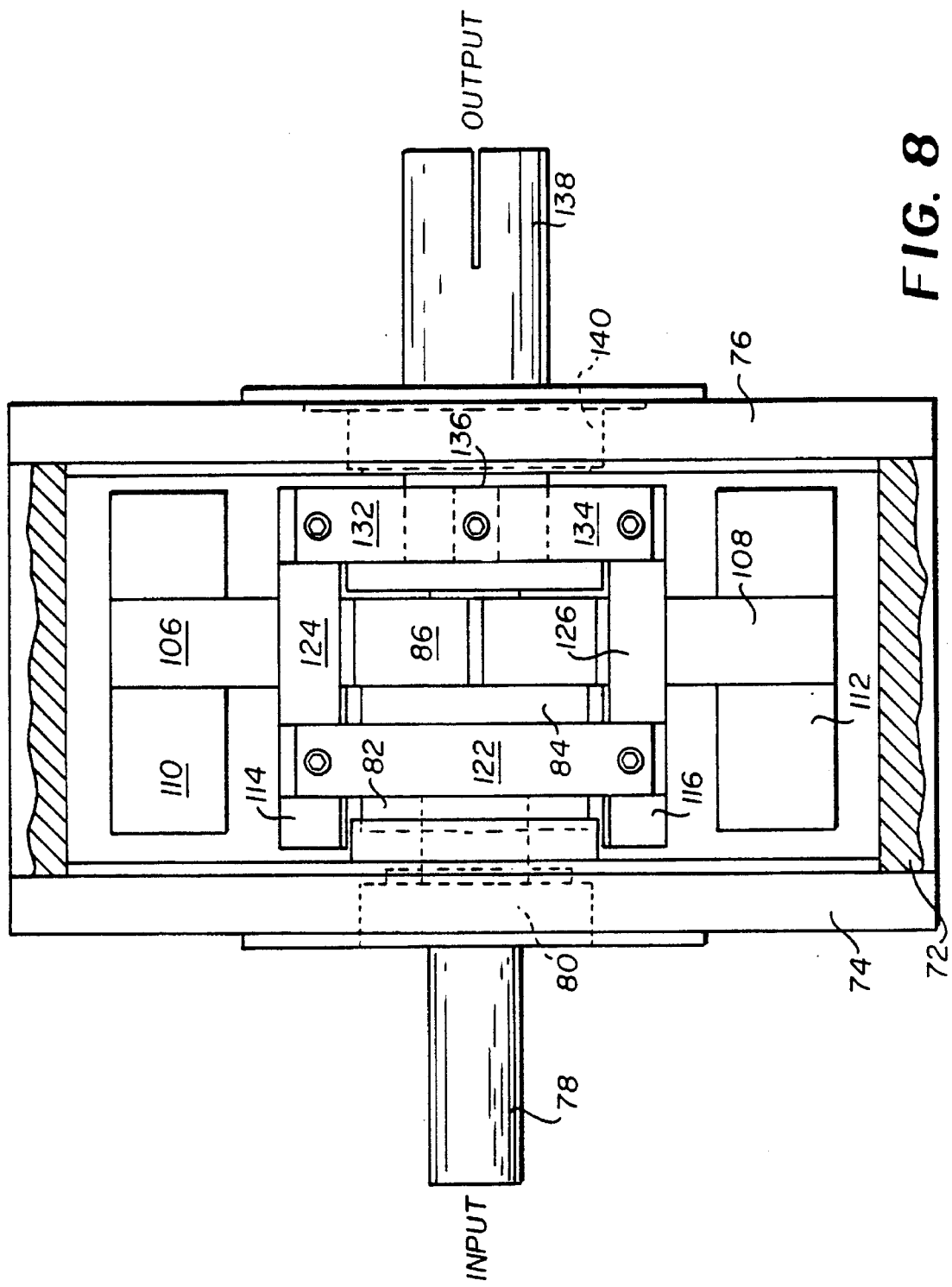
FIG. 8 illustrates a top view of the apparatus of FIG. 6, with the cylindrical housing partially taken away.
Figure 9:
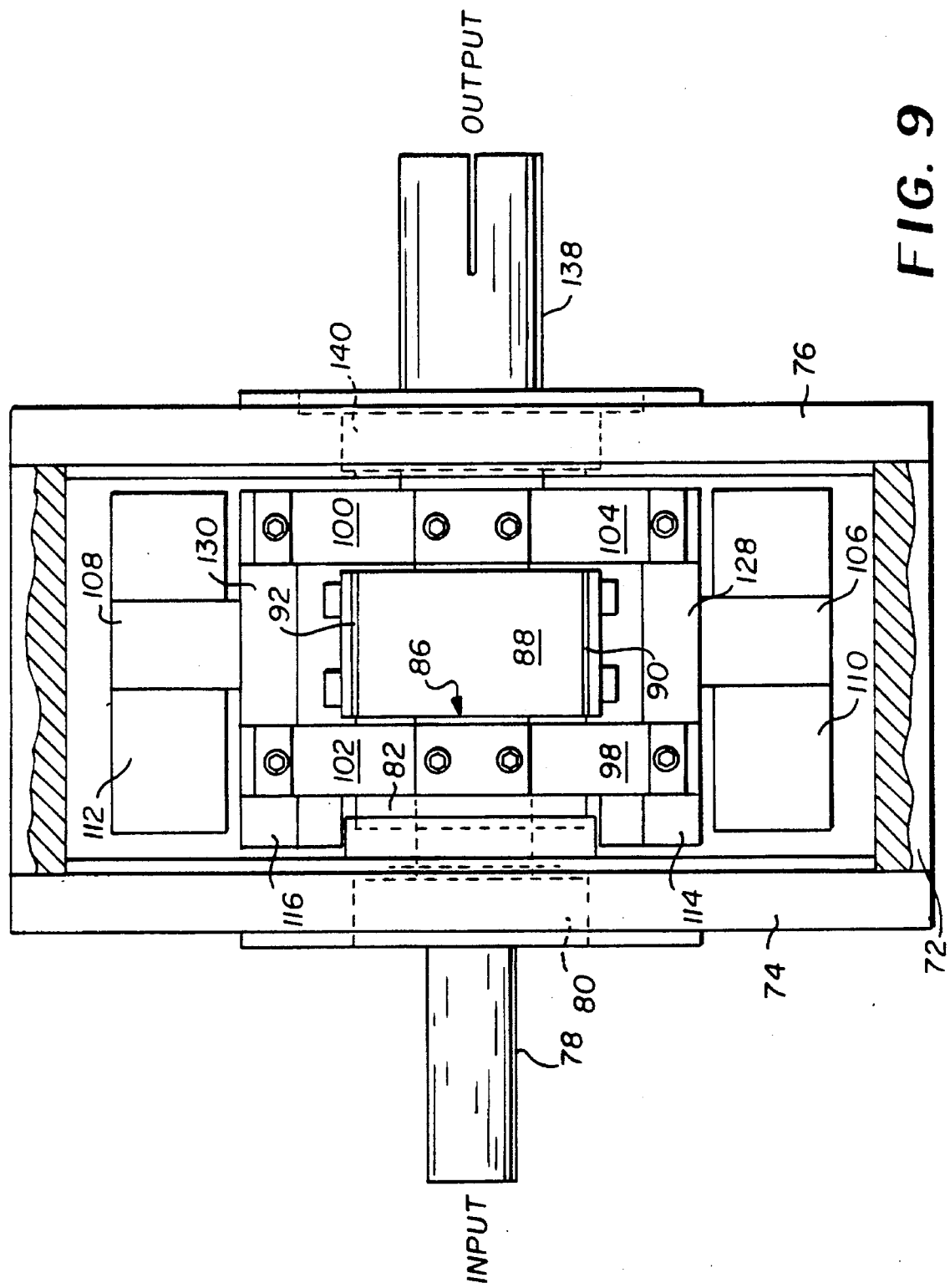
FIG. 9 illustrates a bottom view of the apparatus of FIG. 6, with the cylindrical housing partially broken away.
Figure 10:
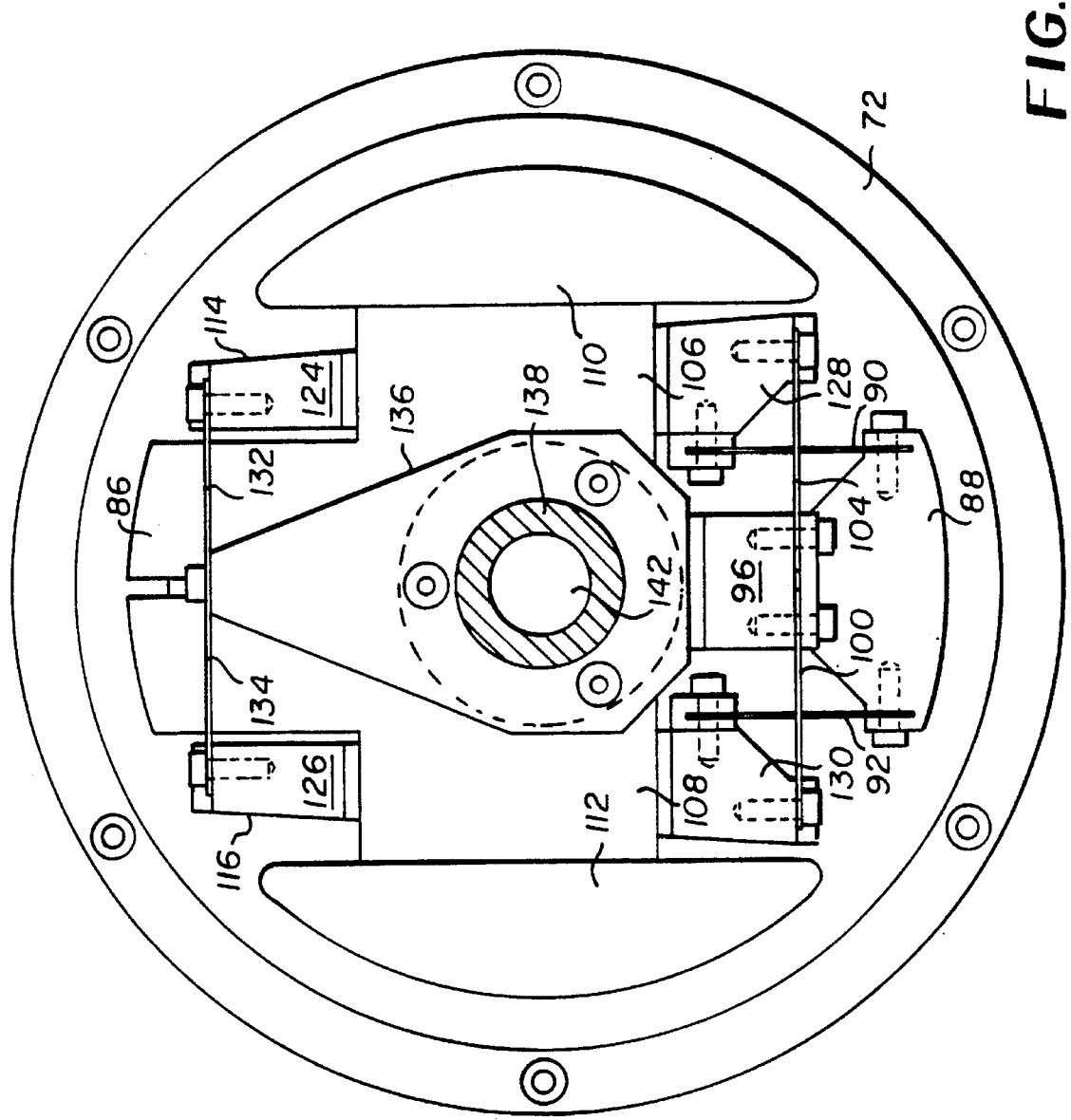
FIG. 10 illustrates a rear view taken along line 10—10 of FIG. 7.
Figure 11:
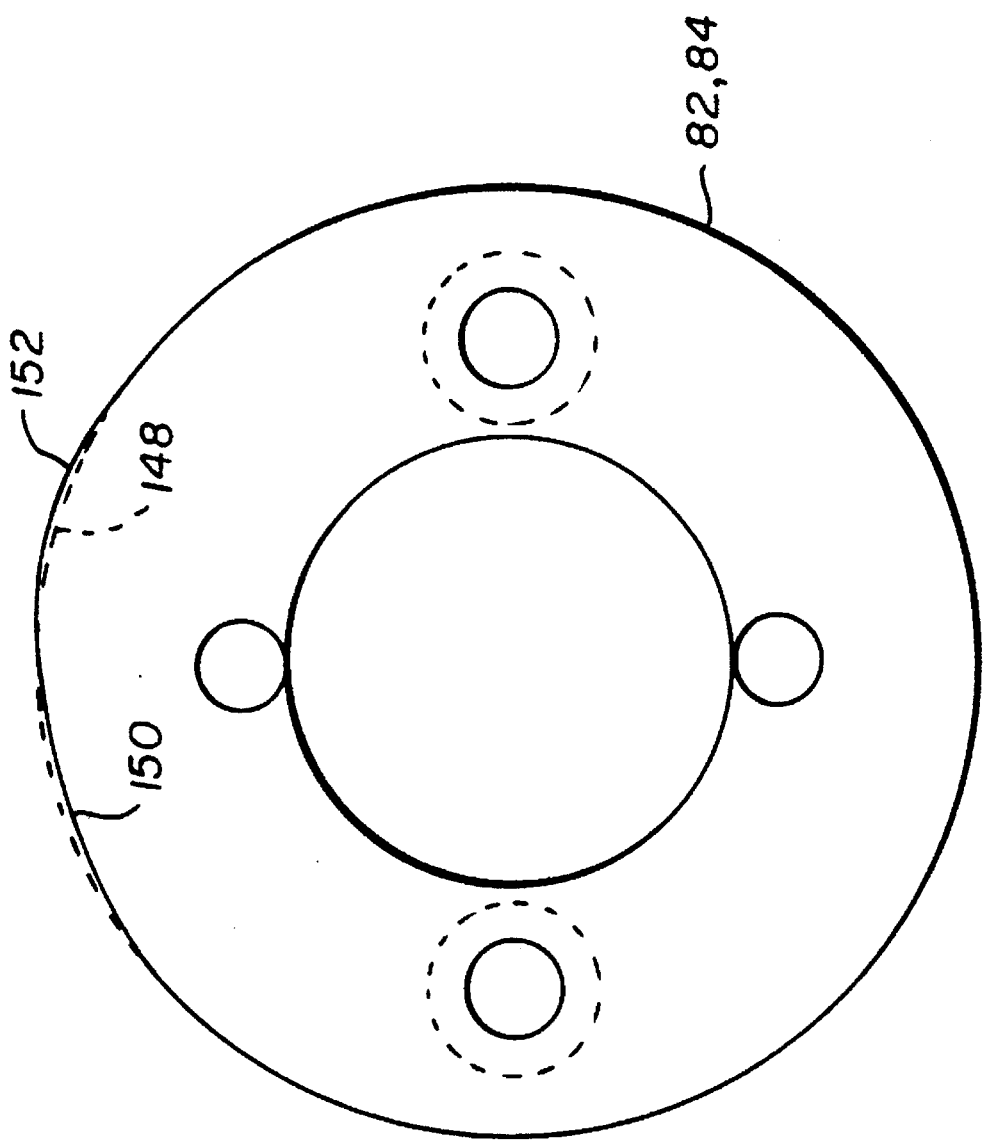
FIG. 11 illustrates a plan view of one of the conjugate cams.

As seen in FIGS. 8 and 10, cam follower carriers 114, 116 include respective axially extended arms 124, 126 on one side of radial arms 106, 108; and respective axially extended arms 128, 130 on the other side of the radial arms. Arms 128, 130 are connected, respectively to flexure pairs 90, 104; and 92, 100. From free ends of arms 124, 126 are extended a pair of tangential flexures 132, 134 whose other ends are attached to an output arm 136 fixedly mounted to an output shaft 138 supported in back cover plate 76 by a bearing 140. A counter bore 142 in shaft 138 telescopically receives an extension 144 of input shaft 78, the extension being rotationally supported by a pair of bearings 146 within bore 142.

As seen in FIG. 11, cams 82, 84 are essentially circular in profile, as indicated by the dotted line 148, except for a small portion 150 of reduced radius and a small portion 142 of increased radius. To achieve a degree of correction as shown in Figure 5A, the cams may have a circular radius of about 1.0 inch (25.4 mm); and portion 150 may extend over an arc of 40° to 45° and have a radius which gradually decreases to 0.981 inch (24.92 mm) at a center of the portion and then gradually increases to the full circular radius. Similarly, portion 152 may extend over the same arc and have a radius which gradually increases to 1.019 inch (25.88 mm) at a center of the portion and then gradually decreases to the full circular radius. Substantially larger corrections can be achieved with longer arcs and greater changes in radius. The cams are installed with their respective portions 150, 152 at 180° out of phase. As a result, when cam 82 forces carrier 116 to move radially outwardly, cam 84 permits carrier 118 to follow, and vice versa.

In operation of the embodiment of FIGS. 6 to 11, rotation of shaft 78 causes rotation of support member 86 and the supported cam follower carriers. When the cam followers are on the full circular portions of the fixed cams, output arm 136 rotates in phase with input shaft 78. But, when cam followers 118, 120 encounter portions 150, 152, cam follower carriers 114, 116 are pivoted on their support flexures, thus causing output arm 136 to momentarily lag input shaft 78 and then return to phase with the input shaft.

We claim:

1. Apparatus for providing a variable angular velocity coupling between an input shaft and an output shaft, comprising:

a fixed frame;

a first bearing for mounting the input shaft for rotation relative to the fixed frame;

a second bearing for mounting the output shaft for rotation relative to the fixed frame;

a pair of conjugate cams mounted to the fixed frame, concentric with the input shaft;

a first cam follower pivotably supported by the input shaft for engaging a first of the cams;

a second cam follower pivotably supported by the input shaft for engaging a second of the cams;

a first link extended between the first and second cam followers to cause the followers to move in tandem in response to rotation of the input shaft relative to the cams;

a radially extended output arm supported by the output shaft; and a second link extended between at least one of the cam followers and the output arm to rotate the output shaft in response to rotation of the input shaft, the cams having profiles to cause a relative angular displacement between the input and output shafts, thereby creating a sinusoidally varying angular velocity of the output shaft over a portion of each revolution in response to a constant angular velocity of the input shaft.

2. Apparatus according to claim 1, wherein the cam followers are supported by cooperating flexures.

3. Apparatus according to claim 1, wherein the first and second links comprise flexures.

4. Apparatus according to claim 1, wherein the output shaft comprises a counter bore, the input shaft comprises an extension into the counter bore and at least one bearing rotatably supports the extension within the counter bore.

* * * * *